United States Patent
Gautier et al.

(10) Patent No.: US 9,008,708 B2
(45) Date of Patent: Apr. 14, 2015

(54) PROCESS AND DEVICE FOR DETECTION OF A FREQUENCY SUB-BAND IN A FREQUENCY BAND AND COMMUNICATIONS EQUIPMENT COMPRISING SUCH A DEVICE

(71) Applicant: Commissariat à l'Energie Atomique et aux Energies Alternatives, Paris (FR)

(72) Inventors: Matthieu Gautier, Meylan (FR); Vincent Berg, Meylan (FR)

(73) Assignee: Commissariat à l'Energie Atomique et aux Energies Alternatives (FR)

( * ) Notice: Subject to any disclaimer, the term of this patent is extended or adjusted under 35 U.S.C. 154(b) by 169 days.

(21) Appl. No.: 13/886,649

(22) Filed: May 3, 2013

(65) Prior Publication Data
US 2014/0038652 A1 Feb. 6, 2014
US 2014/0256370 A9 Sep. 11, 2014

(30) Foreign Application Priority Data
May 4, 2012 (FR) ..................................... 12 54118

(51) Int. Cl.
*H04W 74/08* (2009.01)
*H04L 27/00* (2006.01)

(52) U.S. Cl.
CPC ....... *H04W 74/0808* (2013.01); *H04L 27/0006* (2013.01)

(58) Field of Classification Search
CPC .................... H04W 74/0808; H04W 74/0816; H04W 74/0825; H04W 74/0866; H04W 74/0875; H04W 74/0883; H04W 74/0891; H04W 76/00; H04W 76/002; H04W 76/02; H04W 76/021; H04W 76/022

USPC ......... 455/509, 452, 67.1, 501, 76, 84, 67.13, 455/45, 47, 22, 20, 104, 188.1, 336; 375/376, 375; 370/480, 328; 341/51, 341/65, 67
See application file for complete search history.

(56) References Cited

U.S. PATENT DOCUMENTS

| 6,215,422 | B1 * | 4/2001 | Henry et al. | ..................... 341/51 |
| 2002/0187799 | A1 * | 12/2002 | Haartsen | ....................... 455/509 |

(Continued)

FOREIGN PATENT DOCUMENTS

WO 2009130372 A1 10/2009

OTHER PUBLICATIONS

Chen et al., "Spectrum Sensing for Wireless Microphone Signals", Dept. of Electrical and Computer Engineering, Rutgers University, 2008.
European Search Report for Application No. EP13166350 dated May 30, 2013.
Federal Communications Commission, Second Memorandum Opinion and Order, Sep. 23, 2010.
French Search Report for Application No. FR1254118 dated Feb. 26, 2013.

(Continued)

*Primary Examiner* — Tan Trinh
(74) *Attorney, Agent, or Firm* — Lerner, David, Littenberg, Krumholz & Mentlik, LLP

(57) ABSTRACT

The invention relates to a process for detection of a signal in a frequency sub-band of a frequency band of an acquired signal y(t), the process comprising:
acquisition of the signal y(t) in a frequency band;
frequential analysis of said acquired signal y(t) to obtain at least one frequential signal Y with $N_{FFT}$ frequential components;
breakdown into M frequency sub-bands i of size N of the frequential signal Y, the size of each frequency sub-band being a function of the bandwidth of the signal to be detected;
determination, in the frequential domain, for each frequency sub-band, of a criterion $T_i$, i=1, . . . , M as a function of the energy of the signal in the frequency sub-band i and of the coefficient two of the autocorrelation function of the signal in the frequency sub-band i;
decision, as a function of the criterion $T_i$, to determine whether a signal is detected in the sub-band i.

12 Claims, 2 Drawing Sheets

(56) References Cited

U.S. PATENT DOCUMENTS

| | | | | |
|---|---|---|---|---|
| 2005/0210157 | A1* | 9/2005 | Sakoda | 709/251 |
| 2009/0135761 | A1* | 5/2009 | Khandekar et al. | 370/328 |
| 2009/0147901 | A1* | 6/2009 | Do et al. | 375/375 |
| 2009/0147904 | A1* | 6/2009 | Do et al. | 375/376 |

OTHER PUBLICATIONS

Ghosh et al., "Spectrum Sensing Prototype for Sensing ATSC and Wireless Microphone Signals", Philips Research North America, 2008.

Han et al., "Spectral Correlation Based Signal Detection Method for Spectrum Sensing in IEEE 802.22 Wran Systems", Graduate School of IT & Telecomminications INHA University, Feb. 20 2006, pp. 1765-1770.

Kaiser, "On a simple algorithm to calculate the 'energy' of a signal", Bell Communications Research, Inc., 1990, pp. 381-384.

Matthieu Gautier et al., "Teager-Kaiser energy detector for narrowband wireless microphone spectrum sensing". Cognitive Radio Oriented Wireless Networks & Communication (CROWNCOM). 2010 Proceedings of the Fifth International Conference on, IEEE, Piscataway, NJ, USA, Jun. 9, 2010, pp. 1-5.

Shaoyi Xu et al., "SVD based Sensing of a Wireless Microphone Signal in Cognitive Radio Networks", School of Telecommunication Engineering, 2008, pp. 222-226.

\* cited by examiner

PROCESS AND DEVICE FOR DETECTION OF A FREQUENCY SUB-BAND IN A FREQUENCY BAND AND COMMUNICATIONS EQUIPMENT COMPRISING SUCH A DEVICE

CROSS REFERENCE TO RELATED APPLICATIONS

This application claims priority from French Patent Application No. 1254118 filed May 4, 2012, the disclosure of which is hereby incorporated herein by reference.

TECHNICAL FIELD

The invention relates to the field of cognitive radio and in particular the detection of a frequency sub-band in a frequency band analysed especially to detect communications equipment occupying the frequency sub-band.

BACKGROUND OF THE INVENTION

Cognitive radio is a telecommunications system capable of configuring its radio parameters as a function of its environment.

A promising application of cognitive radio comprises improving occupation of the spectrum using the use of the dynamic spectrum.

Cognitive radio can detect if a portion of the spectrum is being used or not and temporarily occupy it without creating interference for other users.

As for any radio frequency system, cognitive radio must comply with the rules stipulated by the organisms regulating the spectrum.

Today, these organisms (especially the « Federal Communications Commission» (FCC) in the USA) are starting to authorise use of cognitive radio in the bands freed up by the dividende digital. Reference can be made to the document FCC: « Second Memorandum Opinion and Order» , September 2010, which mentions empty space between coverage zones of television stations (in English, « TV white space» ).

In UHF bands (that is, Ultra-High Frequency, frequencies are between 300 MHz and 3000 MHz, especially between 470 MHz and 790 MHz (TV-UHF bands)) primary users, that is, users granted an access license to the spectrum, are digital television and wireless microphones. It is envisaged that these primary users are prioritised relative to the new cognitive systems. Sharing the spectrum is therefore done by prioritising the quality of service and therefore the signal of these primary users. It can be said that the primary system has to be protected from secondary cognitive systems. In practice, primary users correspond to users having priority access to the spectrum.

If digital television systems can be protected efficaciously by defining a database and its consultation by geolocalisation, this solution is difficult to apply to wireless microphones, as their large number and their random deployment make it impossible to update a database.

Spectrum detection is therefore always the solution for protecting microphones.

Contrary to detection of digital television signals which can utilise the cyclostationary characteristics of OFDM modulation, detecting the spectrum of wireless microphones is difficult due to the few characteristics a priori of its signal.

Solutions based on blind detectors are known (see document H,-S. Chen, W., Gao, and D. Daut, « Spectrum sensing for wireless microphone signals» , IEEE Sensor, Mesh and Ad Hoc Communications and Networks Workshops (SECON08), June 2008). These solutions are based on eigenvalue decomposition (see document S. Xu, Y. Shane, and H. Wang, « SVD based Sensing of a Wireless Microphone Signal in Cognitive Radio Networks» , IEEE International Conference on Communications Systems, November 2008), spectral correlation (see document N. Han, S. M. Shon, J. O. Joo, and J. M. Kim, "Spectral correlation-based signal detection method for spectrum sensing in IEEE 802.22 systems» , International Conference on Advanced Communication Technology, February 2006) or an energy detector (see document M. Ghosh, V. Gaddam, G. Turkenich, and K. Chaiiapali, « Spectrum-Sensing Prototype for Sensing ATSC and Wireless Microphone Signals» , International Conference on Cognitive Radio Oriented Wireless Networks and Communications (CROWNCOM08), May 2008).

One of the properties common to these algorithms is that they presuppose the detection of broadband signals. However, the European television hand comprises 48 channels of 8 MHz of bandwidth. Each band must be analysed to detect microphones. Their detection is therefore carried out in a narrowband context if the spectral occupation of the microphones (around 100-200 kHz) is compared to the width of a channel UHF (8 MHz).

Broadband solutions are known for resolving this problem.

Document WO 2009130372 describes such a bandwidth solution for detecting a narrowband signal.

Known broadband solutions have been dissatisfactory and are not precise enough.

There is consequently a need for proposing a solution for detecting a signal in a signal bandwidth.

BRIEF SUMMARY OF THE INVENTION

The invention proposes a process for detection of a frequency sub-band narrower than the frequency band analysed.

For this purpose, the invention proposes a process for detection of a signal in a frequency sub-band of a frequency band of an acquired signal y(t), the process comprising:
 acquisition of the signal y(t) in a frequency band;
 frequential analysis of said acquired signal y(t) to obtain at least one frequential signal Y with $N_{FFT}$ frequential components;
 breakdown into M frequency sub-bands i of size N of the frequential signal Y, the size of each frequency sub-band being a function of the bandwidth of the signal to be detected;
 determination, in the frequential domain, for each frequency sub-band, of a criterion $T_i$, i=1, ... , M as a function of the energy of the signal in the frequency sub-band i and of the coefficient two of the autocorrelation function of the signal in the frequency sub-band i;
 decision, as a function of the criterion $T_i$, to determine whether a signal is detected in the sub-band i.

The process of the invention can advantageously be completed by the following characteristics, taken alone or in any technically possible combination:
 frequential analysis comprises:
 breaking down the acquired signal in the time field into $N_t > 1$ blocks of $N_{FFT}$ samples;
 serial to parallel conversions of each of the $N_t$ blocks to obtain $N_{FFT}$ parallel samples;
 determining, for each of the $N_t$ blocks, the Fourier transform of each, of the $N_t$ blocks to obtain the frequential signal Y at $N_{FFT}$ frequential components for each of the blocks.
 Breakdown into M frequency sub-bands i of size N ($N<N_{FFT}$) the $N_{FFT}$ frequential components of each of the $N_t$ blocks, and in which there are $N_t$ criteria $T_i$ per frequency sub-band, the decision being made over an average of $N_t$ criteria of each frequency sub-band.

it comprises pre-processing of blocks comprising fixing $N_{FFT}$ such that $Nt \times N_{FFT}(1-\alpha)$ is the number of samples of the time signal y(t) broken down, where $\alpha$ is a recovery rate between adjacent samples and if $\alpha=0$, the number of samples being covered by FFT is equal to $N_{FFT} \times \alpha$; if $\alpha<0$, the number of additional samples per FFT is equal to $N_{FFT} \times \alpha$; if $\alpha=0$, neither recovery nor addition.

the breakdown step consists of frequentially scanning the frequency band of the acquired signal by means of a window sliding in frequency along said frequency band.

the size N of each frequency sub-band/is defined by $$N = \frac{N_{FFT}}{M(1-OR)},$$

where OR is an overlapping rate between two adjacent sub-bands.

the criterion $T_i$ is defined by $T_i = C_y^i[0] - C_y^i[2]$, with $$C_y^i[0] = \sum_{v=0}^{N-1} Y(v) Y^*(v)$$

the autocorrelation function of the signal in the frequency sub-band i and $$C_y^i[2] = \sum_{v=0}^{N-1} Y(v) Y^*(v) e^{j2\pi \frac{v}{N} 2}$$

the coefficient two of the autocorrelation function in the frequency sub-band i.

it comprises a step according to which as a function of the result of detection one or more items of communications equipment is allocated a frequency sub-band of the telecommunications network.

the acquired signal originates from a microphone.

The invention also relates to a device for detection of a signal in a frequency sub-band of a frequency band of an acquired signal, the device comprising:

an acquisition unit for acquiring said signal y(t) in a frequency band;

a frequential analysis unit for conducting frequential analysis of said acquired signal y(t) to obtain at least one frequential signal Y with $N_{FFT}$ frequential components;

a breakdown unit for breaking down into M frequency sub-bands i of size N the frequential signal, the size of each frequency sub-band being a function of the bandwidth of the signal to be detected;

at least one determination unit to determine, in the frequential domain, for each frequency sub-band a criterion $T_i$, $i=1, \ldots, M$ as a function of the energy of the signal in the frequency sub-band i and of the coefficient two of the autocorrelation function of the signal in the frequency sub-band i;

at least one decision unit for deciding, as a function of the criterion $T_i$, if a signal is detected in the sub-band i.

The invention also relates to communications equipment such as a microphone comprising a detection device according to the invention.

The invention has numerous advantages.

As detection is carried out in the frequential domain, the invention enables bandwidth analysis where detection is carried out over several frequency bands rather than over one band at a time.

Also, detection is more precise and faster than with known techniques.

BRIEF DESCRIPTION OF THE DRAWINGS

Other characteristics, aims and advantages of the invention will emerge from the following description which is purely illustrative and non-limiting and which must be viewed in terms of the attached diagrams, in which.

DETAILED DESCRIPTION

Figure 1:
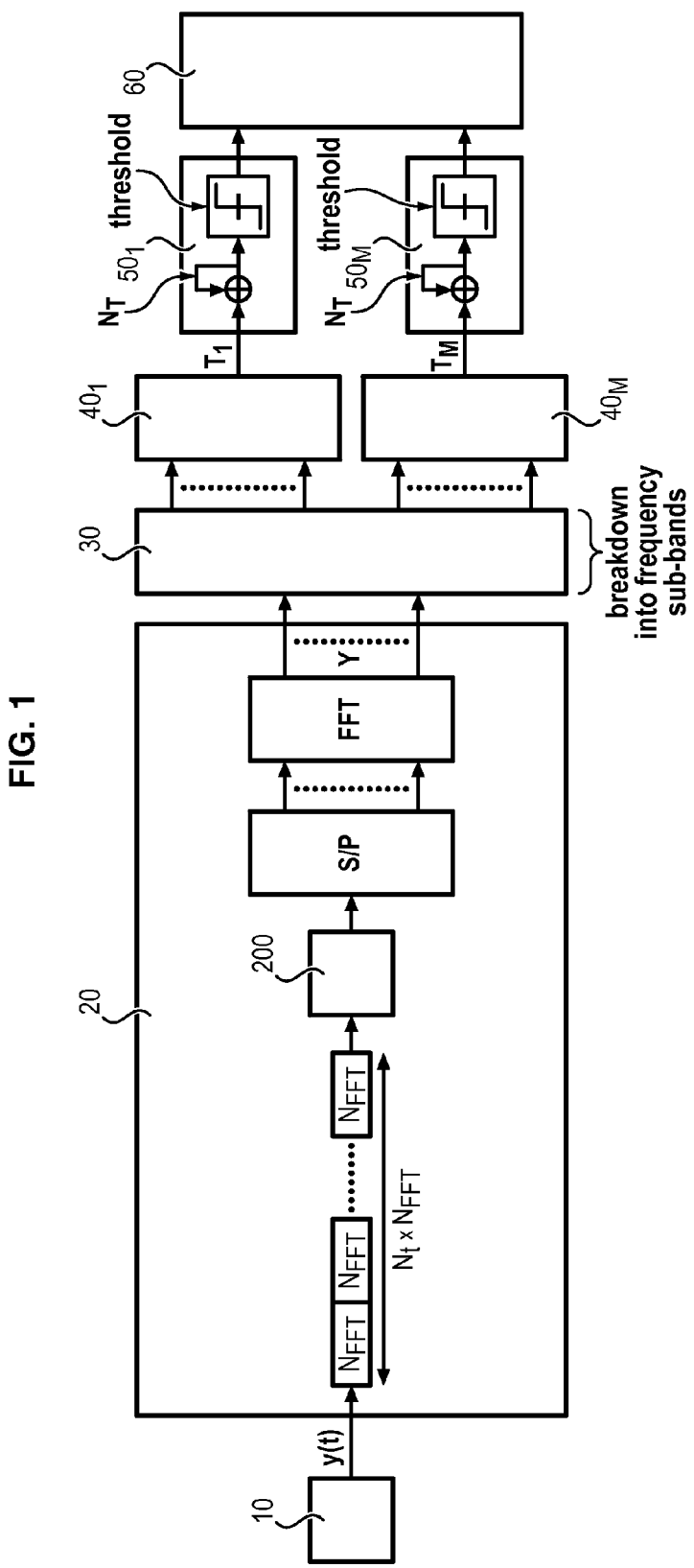
FIG. 1 illustrates a device for detection as per an embodiment of the invention.
Figure 2:
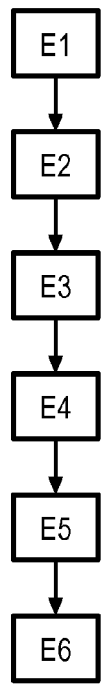
FIG. 2 illustrates steps of a detection process as per an embodiment of the invention.

In relation to FIG. 1 a detection device, according to an embodiment of the invention, comprises an acquisition unit 10 for acquiring E1 a signal y(t) in a frequency band.

The device for detection will detect if at least one frequency sub-band is occupied for example by communications equipment transmitting in a telecommunications network defined in the UHF band.

The communications equipment can be a DVB-T signal transmitter of 8 MHz bandwidth or a wireless microphone transmitting a bandwidth signal from 100 KHz to 200 kHz.

This will detect if a frequency sub-band of width less than the band of the signal y(t) is occupied.

Once the signal y(t) is acquired, a frequential analysis unit 20 conducts frequential analysis E2 of the acquired signal y(t).

This frequential analysis E2 comprises breaking down E10 the acquired signal in the time field into $N_t$ blocks comprising $N_{FFT}$ samples then conducting E11 block-by-block serial/parallel conversions of the $N_{FFT}$ samples by means of a serial/parallel converter.

Alternatively or in addition, overlapping of the samples of adjacent blocks can be introduced prior to serial/parallel conversion or else additional samples can be introduced between each block or between each frequential component by means of a unit 200 for pre-processing of blocks.

The number $N_{FFT}$ of samples is consequently fixed such that the total number of samples is equal to $Nt \times N_{FFT}(1-\alpha)$ where with $\alpha$ is a recovery rate between adjacent samples and where if $\alpha>0$, the number of samples being covered by FFT is equal to $N_{FFT} \times \alpha$;

if $\alpha<0$, the number of additional samples per FFT is equal to $N_{FFT} \times \alpha$;

if $\alpha=0$, neither recovery nor addition.

The result is consequently $N_t$ blocks of $N_{FFT}$ parallel samples.

Next, the Fourier transform of each of the $N_t$ blocks is determined E12 to obtain $N_t$ frequential signals Y with $N_{FFT}$ frequential components.

On completion of determination of the Fourier transform, for each of these $N_t$ blocks, the signal is obtained $$Y(v) = \sum_{k=0}^{N_{FFT}-1} y[k] e^{-j2\pi \frac{v}{N_{FFT}} k}$$

With v the frequency index.

Once frequential analysis is complete, the aim of the detection process is to determine a metric in several sub-bands which decides on the presence or not of a signal in the sub-band and therefore concludes in the presence of communications equipment in the telecommunications network in this sub-band.

Before determining the metrics, a breakdown unit 30 is used to break down E3 into M frequency sub-bands i of size N (N<$N_{FFT}$) the $N_{FFT}$ frequential components of each of the $N_t$ blocks, the size of each frequency sub-band being a function of the bandwidth of the signal of the communications equipment to be detected.

This breakdown unit 30 manages the method of frequentially scanning the frequency band in which the signal was acquired.

So, breakdown E3 consists of frequentially scanning the frequency band of the acquired signal by means of a window sliding in frequency along said frequency band. The scanning in the frequential domain benefits from the gain in complexity of the FFT which is carried out per block over the entire band. The processing on each sub-band is realised at a slower rhythm (the rhythm decimated by $N_{FFT}$) and therefore relatively more complex. Elements of architecture flexibility are added thereto. The choice of the sub-band can be made dynamically by selection of frequential sounds of interest and can therefore be adapted.

As a function of the signal to be detected, a parameter of the breakdown E3 is an overlapping rate between two adjacent bands of frequency.

Therefore, the size N of each frequency sub-band i is defined by $$N = \frac{N_{FFT}}{M(1-OR)}$$

where OR is the overlapping rate between two adjacent sub-bands.

The parameters M and OR are fixed as a function of the signal to be analysed. For example, if a band of 40 MHz is analysed and a DVB-T signal of 8 MHz is to be detected, M=5 sub-bands and a zero overlapping rate (OR=0) must be used. If wireless microphone signals are preferred in a band of 8 MHz, an overlap is necessary due to the random position of the frequency of the signal and the bandwidth of each sub-band must be regulated over 200 kHz. An overlapping rate of 0.5 is also feasible in this case. A method for selecting the optimum overlapping rate is to maximise the detection probability of the narrowband signal (wireless microphone) as a function of the constraints of calculation complexity of the system (the higher the overlapping rate, the greater the complexity).

On completion of this breakdown, by means of several units 40i (i=1, . . . , M), E4 is determined, in the frequential domain, for each frequency sub-band i a criterion $T_i$, i=1, . . . , M as a function of the energy of the signal in the frequency sub-band i and of the coefficient 2 of the autocorrelation function of the signal in the frequency sub-band i. There are therefore $N_t$ criteria per frequency sub-band i.

This criterion $T_i$ is the frequential version of the Teager-Kaiser criterion. Reference can be made to documents M. Gautier, M. Laugeois and D. Noguet: "*Teager-Kaiser energy detector for narrowband wireless microphone spectrum sensing*", in Proc. of the 5th Int. Conf. Cognitive Radio Oriented Wireless Networks and Communications (CROWNCOM), Cannes, France, June 2010 and J. F. Kaiser: "*One simple algorithm to calculate the energy of signal*," IEEE International Conference on Acoustics, Speech, and Signal Processing (ICASSP90), April 1990.

In the frequential domain, this criterion is expressed by:

$$T_i = C_y^i[0] - C_y^i[2]$$

with $$C_y^i[0] = \sum_{v=0}^{N-1} Y(v) Y^*(v)$$

the autocorrelation function of the signal in the frequency sub-band i and $$C_y^i[2] = \sum_{v=0}^{N-1} Y(v) Y^*(v) e^{j2\pi \frac{v}{N} 2}$$

the coefficient 2 of the autocorrelation function in the frequency sub-band i.

The criterion $T_i$, is then averaged over $N_t$ values to reject measuring noise and construct the averaged criterion noted as $\overline{T}_i$.

Next, a decision unit 50i is used to decide (E5), as a function of the criterion $\overline{T}_i$, whether equipment is transmitting a signal in the sub-band i. The decision unit can use a threshold $\overline{T}_{REF}$: if $\overline{T}_i$ is greater than $\overline{T}_{REF}$ a narrowband signal is detected, and if not no narrowband signal is detected. The choice of this threshold can be made by simulation using a criterion of false detection and non-detection of the narrowband signal (wireless microphone).

On completion of this decision step E5 it is possible to determine whether frequency bands i are free and optionally allocate E6 the free frequency bands to communications equipment.

Figure 4:
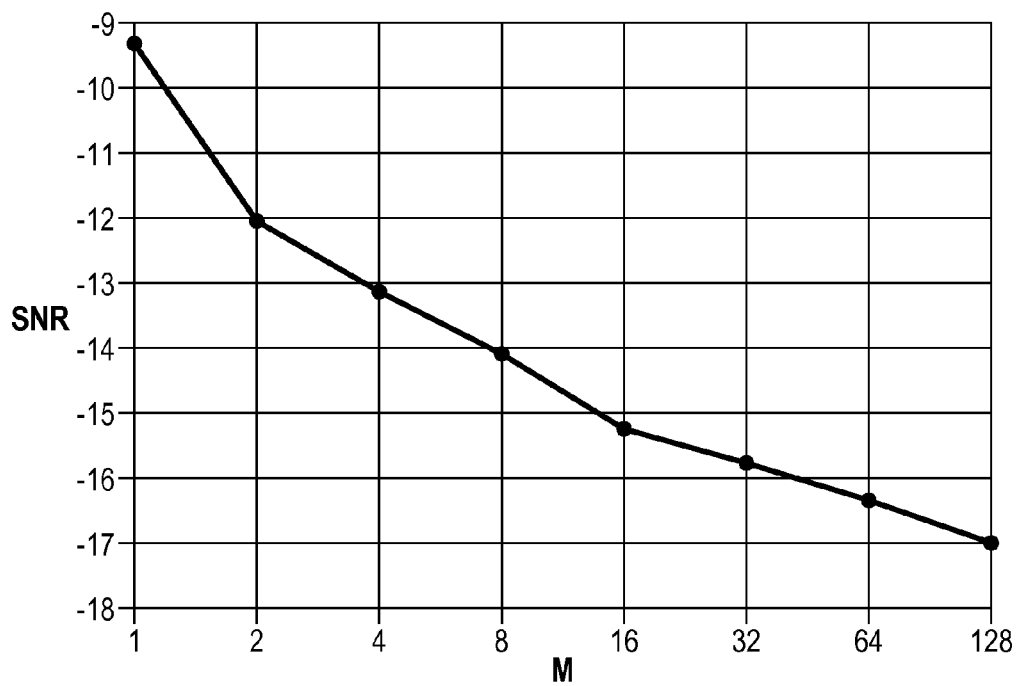
FIG. 4 illustrates detection performances gained by means of a process and a device as per an embodiment of the invention.

FIG. 4 illustrates detection performances obtained by the device and the process of the invention.

A frequency band of 8 MHz corresponding to European specifications of UHF bands was analysed. The baseband signal of the microphone is transmitted with the following parameters:

the signal modulating at a frequency band of 20 kHz,
the FM deviation is equal to 3,
the carrier frequency is equal to 100 kHz; and
the power of the noise is fixed at 0 dBm.

In these conditions, the transmitted signal has a frequency band of around 100 kHz.

$N_t$ is fixed at 4096.

Figure 3:
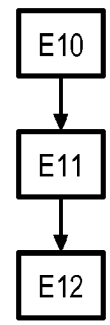
FIG. 3 illustrates sub-steps of a step of a selection process as per an embodiment of the invention.

FIG. 3 in particular illustrates the sensitivity of detection as a function of the number of sub-bands.

The sensitivity is the minimum signal-to-noise ratio (in English, « Signal-to-Noise Ratio» , (SNR)) which the detection device can detect with a detection probability of 95% and false alarm of 1%.

This figure ensures that signals with a sensitivity of −17 dB obtained for M=128 can be detected. An improvement of 8 dB is accordingly obtained relative to M=1.

The invention claimed is:

1. A process for detection of a signal in a frequency sub-band of a frequency band of an acquired signal y(t), the process comprising:
   acquisition (E1) of the signal y(t) in a frequency band;
   frequential analysis (E2) of said acquired signal y(t) to obtain at least one frequential signal Y with $N_{FFT}$ frequential components;
   breakdown (E3) into M frequency sub-bands i of size N of the frequential signal Y, the size of each frequency sub-band being a function of the bandwidth of the signal to be detected;
   determination (E4), in the frequential domain, for each frequency sub-band, of a criterion $T_i$, i=1, ..., M as a function of the energy of the signal in the frequency sub-band i and of the coefficient two of the autocorrelation function of the signal in the frequency sub-band i;
   decision (E5), as a function of the criterion $T_i$, to determine whether a signal is detected in the sub-band i.

2. The process as claimed in the preceding claim 1, in which frequential analysis (E2) consists of: breaking down (E10) the acquired signal in the time field into $N_t$>1 blocks of $N_{FFT}$ samples; serial to parallel conversions (E11) of each of the $N_t$ blocks to obtain $N_{FFT}$ parallel samples; determining (E12), for each of the $N_t$ blocks, the Fourier transform of each of the $N_t$ blocks to obtain the frequential signal Y at $N_{FFT}$ frequential components for each of the $N_t$ blocks.

3. The process as claimed in the preceding claim 2, in which the $N_{FFT}$ frequential components of each of the $N_t$ blocks are broken down (E3) into M frequency sub-bands i of size N (N<$N_{FFT}$), and in which there are $N_t$ criteria $T_i$ per frequency sub-band, the decision (E5) being made on an average of $N_t$ criteria $T_i$ of each frequency sub-band.

4. The process as claimed in claim 1, comprising preprocessing of blocks comprising fixing $N_{FFT}$ such that $Nt \times N_{FFT}(1-\alpha)$ is the number of samples of the broken down time signal y(t) where a is a recovery rate between adjacent samples.

5. The process as claimed in the preceding claim 4, in which if .alpha.>0, the number of samples being covered by FFT is equal to $N_{FFT}$.alpha. if .alpha.<0, the number of additional samples per FFT is equal to $N_{FFT}$.alpha. if .alpha.=0, neither recovery nor addition.

6. The process as claimed in claim 1, in which the breakdown step (E3) consists of frequentially scanning the frequency band of the acquired signal by means of a window sliding in frequency along said frequency band.

7. The process as claimed in claim 6, in which the size N of each frequency sub-band i is defined by $$N = \frac{N_{FFT}}{M(1-OR)},$$

where OR is an overlapping rate between two adjacent sub-bands.

8. The process as claimed in claim 1, in which the criterion $T_i$ is defined by $$T_i = C_y^i[0] - C_y^i[2],$$

with $$C_y^i[0] = \sum_{v=0}^{N-1} Y(v)Y^*(v)$$

the autocorrelation function of the signal in the frequency sub-band i and $$C_y^i[2] = \sum_{v=0}^{N-1} Y(v)Y^*(v)e^{j2\pi\frac{v}{N}2}$$

the coefficient two of the autocorrelation function in the frequency sub-band i.

9. The process as claimed in claim 1, comprising a step according to which as a function of the result of detection one or more items of communications equipment is allocated (E6) a frequency sub-band of the telecommunications network.

10. The process as claimed in claim 1, in which the acquired signal originates from a microphone.

11. A device for detection of a signal in a frequency sub-band of a frequency band of an acquired signal, the device comprising:
   an acquisition unit (10) for acquiring (E1) said signal y(t) in a frequency band;
   a frequential analysis unit (20) for conducting frequential analysis (E2) of said acquired signal y(t) to obtain at least one frequential signal Y with $N_{FFT}$ frequential components
   a breakdown unit (30) for breaking down (E3) into M frequency sub-bands i of size N the frequential signal, the size of each frequency sub-band being a function of the bandwidth of the signal to be detected;
   at least one determination unit ($40_i$) to determine (E4), in the frequential domain, for each frequency sub-band a criterion $T_i$, i=1, ..., M as a function of the energy of the signal in the frequency sub-band i and of the coefficient two of the autocorrelation function of the signal in the frequency sub-band i;
   at least one decision unit ($50_i$) for deciding (E5), as a function of the criterion $T_i$, if a signal is detected in the sub-band i.

12. Communications equipment such as a microphone comprising a device for detection, as claimed in claim 11.

* * * * *